United States Patent
Ziv et al.

(10) Patent No.: US 11,310,306 B2
(45) Date of Patent: Apr. 19, 2022

(54) SYSTEMS AND METHODS FOR RELIABLE FIRMWARE UPDATE IN TREE-BASED WIRELESS NETWORKS

(71) Applicants: Pinchas Ziv, Rosh Haain (IL); Reuven Cohen, Rosh Haain (IL); Eran Ben-Shmuel, Rosh Haain (IL); Alexander Bilchinsky, Rosh Haain (IL)

(72) Inventors: Pinchas Ziv, Rosh Haain (IL); Reuven Cohen, Rosh Haain (IL); Eran Ben-Shmuel, Rosh Haain (IL); Alexander Bilchinsky, Rosh Haain (IL)

(73) Assignee: JUGANU, LTD., Rosh Haain (IL)

( * ) Notice: Subject to any disclaimer, the term of this patent is extended or adjusted under 35 U.S.C. 154(b) by 114 days.

(21) Appl. No.: 16/678,254

(22) Filed: Nov. 8, 2019

(65) Prior Publication Data
US 2020/0162539 A1    May 21, 2020

Related U.S. Application Data

(60) Provisional application No. 62/757,186, filed on Nov. 8, 2018.

(51) Int. Cl.
*H04L 12/18*  (2006.01)
*H04L 67/06*  (2022.01)
(Continued)

(52) U.S. Cl.
CPC .............. *H04L 67/06* (2013.01); *G06F 8/65* (2013.01); *H04L 12/1868* (2013.01);
(Continued)

(58) Field of Classification Search
CPC ... H04L 12/18; H04L 12/1868; H04L 12/753; H04L 67/06; H04L 29/08; H04L 45/48; H04W 84/18; H04W 40/02; G06F 8/65
See application file for complete search history.

(56) References Cited

U.S. PATENT DOCUMENTS 7,120,926 B1 * 10/2006 Safadi .................. G06F 8/65
                                                    725/132
7,590,116 B2    9/2009 He et al.
(Continued)

OTHER PUBLICATIONS

International Search Report and Written Opinion Corresponding to International Application No. PCT/IB2019/001244 dated Mar. 23, 2020, 15 pages.

*Primary Examiner* — Wei Zhao
(74) *Attorney, Agent, or Firm* — Morgan, Lewis & Bockius LLP (57) ABSTRACT

Approaches for updating a firmware file in a network having multiple transceiver nodes and being capable of receiving and transmitting the firmware file include dividing the firmware file into multiple of chunks, each chunk being able to be included in a single data packet transmitted between two of the transceiver nodes; transmitting each of the chunks from the first one of the transceiver nodes to the second one of the transceiver nodes; transmitting a request message from the first one of the transceiver nodes to the second one of the transceiver nodes, the request message including information associated with the chunks that have been transmitted in step (b); and transmitting a responding message from the second one of the transceiver nodes to the first one of the transceiver nodes, the responding message including information associated with one or more chunks that are included in the request message but not received by the second one of the transceiver nodes.

26 Claims, 7 Drawing Sheets

(51) Int. Cl.
 *H04W 84/18* (2009.01)
 *H04W 40/02* (2009.01)
 *G06F 8/65* (2018.01)
 *H04L 45/48* (2022.01)

(52) U.S. Cl.
 CPC ............. *H04L 45/48* (2013.01); *H04W 40/02* (2013.01); *H04W 84/18* (2013.01)

(56) References Cited

U.S. PATENT DOCUMENTS

| | | |
|---|---|---|
| 8,009,671 B2 | 8/2011 | Dong et al. |
| 8,289,883 B2 | 10/2012 | Ngo et al. |
| 9,497,034 B2 | 11/2016 | Chen et al. |
| 10,666,334 B2 * | 5/2020 | Xiong .................. H04L 5/0048 |
| 2004/0010616 A1 | 1/2004 | McCanne |
| 2008/0095163 A1 | 4/2008 | Chen et al. |
| 2017/0131994 A1 * | 5/2017 | Middleton ............ H04W 4/023 |

\* cited by examiner

SYSTEMS AND METHODS FOR RELIABLE FIRMWARE UPDATE IN TREE-BASED WIRELESS NETWORKS

CROSS-REFERENCE TO RELATED APPLICATION

This application claims priority to and the benefit of U.S. Provisional Application No. 62/757,186 filed on Nov. 8, 2018, the entire disclosure of which is hereby incorporated by reference.

TECHNICAL FIELD

The present invention relates generally to tree-based wireless networks, and in various embodiments more specifically to approaches for reliably updating a firmware file in such networks.

BACKGROUND

Recent developments of Internet and mobile communication technologies provide diverse multimedia services, which may be provided almost instantaneously over vast distances. The proliferation of compact portable electronic devices such as notebook computers, mobile phones and smart devices have necessitated deployment of such services, which tend to be very data-intensive, over wireless networks.

One commonly used wireless network has a tree-based structure. This network architecture is often deployed in device networks organized or governed by controllers. For example, tree-based wireless networks are often used when a controller controls a group of network members (or "nodes"); each group member will be reachable via a path across the wireless tree, enabling a point-to-multipoint communication (P2MP) (such as from the controller to the nodes) and multipoint-to-point communication (MP2P) (such as from the nodes to the controller). Common applications include controlled lighting systems, city-wide automatic meter-reading system etc.

Generally, a tree-based wireless network includes a collection (e.g., thousands) of network nodes; each node includes a firmware file for performing various functions. The firmware file is typically periodically updated to, for example, provide additional functions and/or update the operating environment for more complex software associated with the nodes. Reliably updating the firmware file throughout thousands of network nodes in the tree-based wireless network, although of the most important and most demanding activities in the wireless network, remains challenging.

Figure 1A:
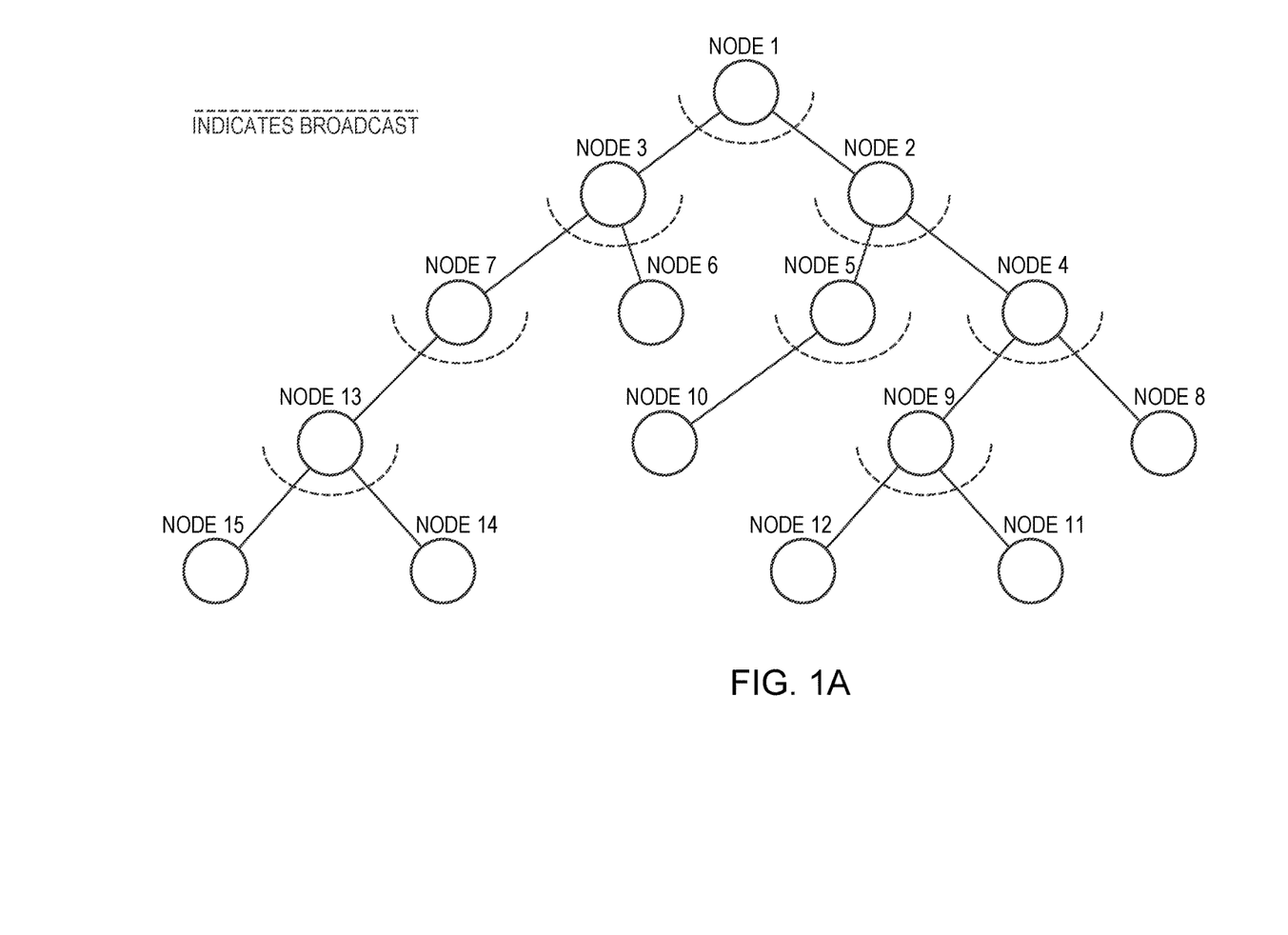
FIGS. 1A and 1B depict various conventional approaches for updating a firmware file in a tree-based wireless network.

For example, referring to FIG. 1A, one conventional approach for updating the firmware file is to "flood" the entire tree and broadcast an updated firmware file to all nodes thereon. Each node, upon receipt of the broadcast file, may re-broadcast the received file to the "down-the-tree" nodes. But because the broadcasts are not acknowledged, the updated firmware file may not reach some of the nodes.

Figure 1B:
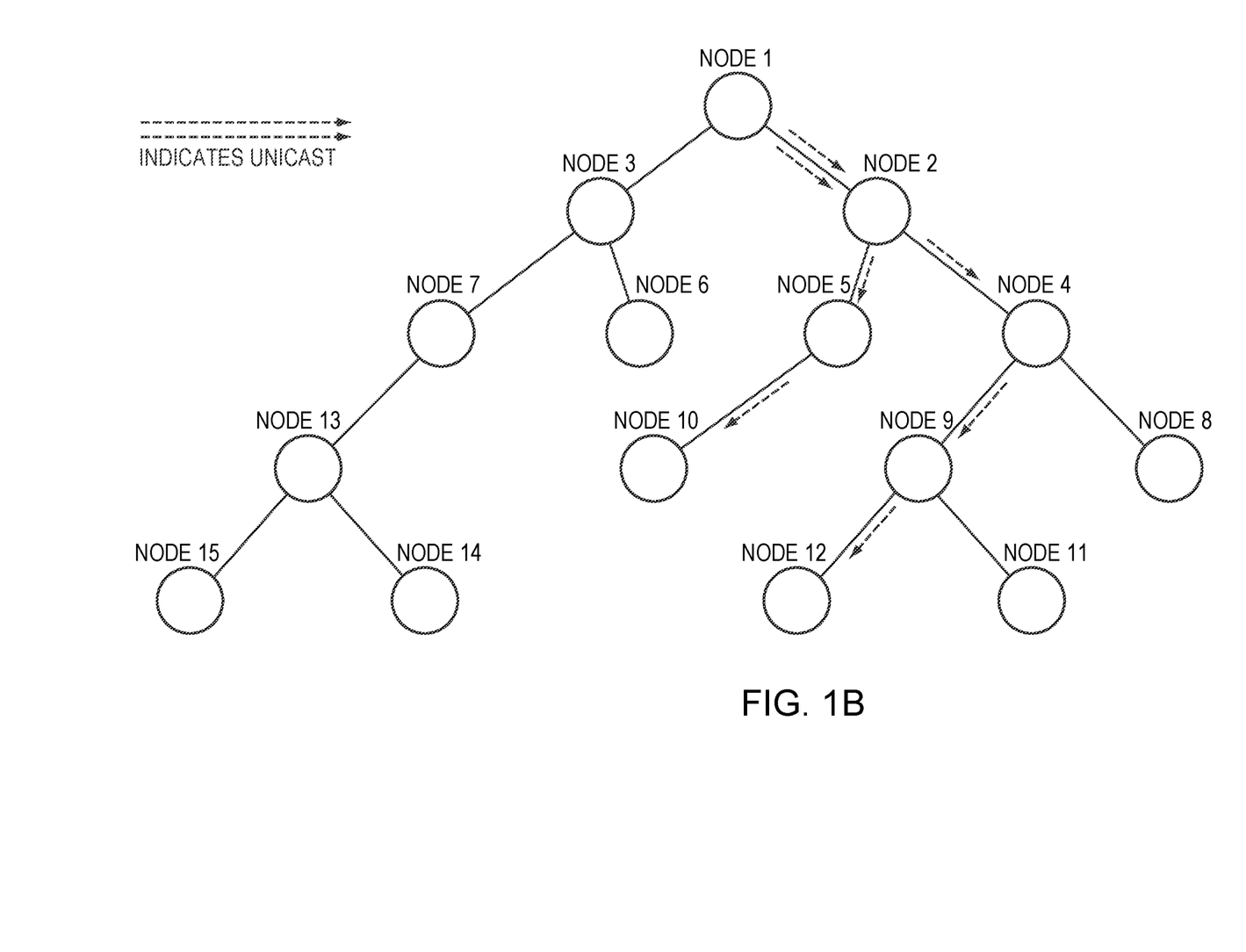

Another conventional approach for updating the firmware file in the network is by individual unicasting. For example, referring to FIG. 1B, each node in the network transmits the updated firmware file in a unicasting manner with acknowledgement. As a result, the probability that the firmware file will be received by all nodes is higher than with non-acknowledged delivery via broadcasting. But because the firmware file usually consists of a large amount of payload, it is extremely inefficient to use unicasting to update the firmware file in the tree-based network. A long period of time (e.g., many days) may be required for the firmware file to reach all the thousands of network nodes.

Accordingly, there is a need for approaches that can efficiently and reliably update the firmware file in the network nodes in a tree-based wireless network.

SUMMARY

The present invention is related to approaches for efficiently and reliably updating a firmware file in a tree-based wireless network by broadcasting the firmware file in the network nodes and allowing the network nodes that transmit and receive the firmware file to communicate so as to ensure receipt of the firmware file in each of the receiving nodes. In various embodiments, the firmware file is divided into multiple chunks (or "blocks"); each chunk is assigned with a sequence number based on its order in the divided firmware file and can be included in a single data packet for transmission from a network node to another network node. In addition, each chunk in the data packet may be preceded by a header that describes, for example, a type of the updated firmware file, a time stamp indicating the release time of the firmware file and/or a sequence number associated with the chunk. In one embodiment, the data packet including the chunk and its associated header can then be broadcast from the root node to its associated child nodes in a transceiver cell. Upon receipt of the data packet, the receiving nodes may determine whether the chunk contained therein is "new" (i.e., an updated version); and if so, the receiving nodes may accept the new chunk and schedule it for future broadcasting to its child nodes in its associated cell.

To ensure reliability of the broadcasting (i.e., each node indeed receives the broadcast chunk), in various embodiments, the parent node periodically transmits to its child nodes a negative-acknowledgment (NACK)-request message indicating the types, time stamps and/or sequence numbers associated with all (or at least some) chunks that the parent node has transmitted. In response to the NACK-request message, each child node may identify the chunk(s) that is listed in the NACK-request message but currently missing in the child node, and report the missing chunk(s) to the parent node using a NACK message. In some embodiments, a transmission approach involving drawing of a random time for the child node to wait before it transmits its NACK message to the parent node is implemented to minimize the number of transmissions of the NACK messages from each child node to the parent node, thereby preventing a "NACK storm" in the parent node.

In some embodiments, upon receipt of the NACK message indicating a list of missing chunks in at least one of its child nodes, the parent node adds the indicated missing chunks to its future schedule for broadcasting. The future schedule may include the missing chunks identified in the NACK messages as well as new chunks that have not been broadcast. In one embodiment, a scheduler logic that classifies the chunks into three states can then be implemented to determine the timing for transmitting a new chunk and/or re-transmitting an old, missing chunk based on the states of the chunks.

Accordingly, various embodiments provide approaches to efficiently updating the firmware file in the network nodes by broadcasting the chunks of the firmware file in the wireless network. In addition, various embodiments ensure reliability of the broadcasting by using the NACK-request messages transmitted from the parent nodes to their associated child nodes and the NACK messages transmitted from the child nodes to the parent nodes in response to the received NACK-request messages.

Accordingly, in one aspect, the invention pertains to a method of updating a firmware file in a network including multiple cells, each supporting communication among multiple transceiver nodes therein and being capable of receiving and transmitting the firmware file, each cell including a parent node and one or more child nodes. In various embodiments, the method includes (a) dividing the firmware file into multiple chunks, each chunk being able to be included in a single data packet transmitted between two of the transceiver nodes; (b) transmitting each of the chunks from the first one of the transceiver nodes to the second one of the transceiver nodes; (c) transmitting a request message from the first one of the transceiver nodes to the second one of the transceiver nodes, the request message including information associated with the chunks that have been transmitted in step (b); and (d) transmitting a responding message from the second one of the transceiver nodes to the first one of the transceiver nodes, the responding message including information associated with at least one of the chunks that is included in the request message of step (c) but not received by the second one of the transceiver nodes.

The method may further include assigning a sequence number to each of the chunks based at least in part on an order of the chunk in the divided firmware file. In addition, each of the chunks in its associated data packet may be preceded by a header including information such as a type of the firmware file, a time stamp indicating a release time of the firmware file, and/or the sequence number associated with the chunk. In some embodiments, the information associated with the chunks in the request message and responding message includes the sequence numbers associated with the chunks. In addition, the method may further include, upon the first one of the transceiver nodes receiving the responding message, storing the sequence number associated with the at least one of the chunks in a delivery queue associated with the first one of the transceiver nodes for further transmission. In one embodiment, the method further includes classifying each of the chunks in the delivery queue into multiple states based at least in part on a status of the chunk in a child node associated with the first one of the transceiver nodes. Further, the method may further include determining a timing for transmitting each of the chunks in the delivery queue based at least in part on its associated state.

In various embodiments, the method further includes, upon the second one of the transceiver nodes receiving the transmitted chunks, determining whether each of the received chunks is associated with a most recently released version of the firmware file. In addition, the method may further include, upon determining that the chunk is associated with the most recently released version of the firmware file, storing the chunk in a database associated with the second one of the transceiver nodes and causing the second one of the transceiver nodes to transmit the chunk to one or more child nodes associated therewith. In one embodiment, the chunks in step (b) are transmitted in a broadcasting manner.

In some embodiments, the method further includes, prior to step (d), determining a time interval for the second one of the transceiver nodes to wait before transmitting the responding message to the first one of the transceiver nodes. The time interval may be determined based at least in part on a number of the chunks included in the request message of step (c) that are not received by the second one of the transceiver nodes. In addition, each of the transceiver nodes may store exactly one complete version of the firmware file whose chunks are all received and at most one outstanding version whose chunks are only partially received.

In another aspect, the invention relates to a network system for updating a firmware file in a network including multiple cells, each supporting communication among multiple transceiver nodes therein and being capable of receiving and transmitting the firmware file, each cell including a parent node and one or more child nodes. In various embodiments, the system includes one or more network management systems associated with one or more of the transceiver nodes; the network management system(s) is configured to (a) divide the firmware file into multiple chunks, each chunk being able to be included in a single data packet transmitted between two of the transceiver nodes; (b) transmit each of the chunks from the first one of the transceiver nodes to the second one of the transceiver nodes; (c) transmit a request message from the first one of the transceiver nodes to the second one of the transceiver nodes, the request message including information associated with the chunks that have been transmitted in step (b); and (d) transmit a responding message from the second one of the transceiver nodes to the first one of the transceiver nodes, the responding message including information associated with one or more chunks that is included in the request message of step (c) but not received by the second one of the transceiver nodes.

The network management system(s) may be further configured to assign a sequence number to each of the chunks based at least in part on an order of the chunk in the divided firmware file. In addition, each of the chunks in its associated data packet may be preceded by a header including information such as a type of the firmware file, a time stamp indicating a release time of the firmware file, and/or the sequence number associated with the chunk. Further, the information associated with the chunks in the request message and responding message may include the sequence numbers associated with the chunks. In one embodiment, the network system further includes memory for storing a delivery queue associated with the first one of the transceiver nodes; the network management system(s) is further configured to, upon the first one of the transceiver nodes receiving the responding message, store the sequence number associated with the chunk(s) in the delivery queue for further transmission. In addition, the network management system(s) may be further configured to classify each of the chunks in the delivery queue into multiple states based at least in part on a status of the chunk in a child node associated with the first one of the transceiver nodes. In one embodiment, the network management system(s) is further configured to determine a timing for transmitting each of the chunks in the delivery queue based at least in part on its associated state.

The network management system(s) may be further configured to, upon the second one of the transceiver nodes receiving the transmitted chunks, determine whether each of the received chunks is associated with a most recently released version of the firmware file. In addition, the network system may further include memory for storing the received chunks in a database associated with the second one of the transceiver nodes; the network management system(s) is then further configured to, upon determining that the received chunks are associated with the most recently released version of the firmware file, cause the second one of the transceiver nodes to transmit the chunks to one or more child nodes associated therewith.

In some embodiments, the chunks in step (b) are transmitted in a broadcasting manner. In addition, the network management system(s) may be further configured to, prior to step (d), determine a time interval for the second one of the transceiver nodes to wait before transmitting the responding message to the first one of the transceiver nodes. In one embodiment, the time interval is determined based at least in part on a number of the chunks included in the request message of step (c) that are not received by the second one of the transceiver nodes. Further, each of the transceiver nodes may store exactly one complete version of the firmware file whose chunks are all received and at most one outstanding version whose chunks are only partially received.

As used herein, the term "chunk" refers to a logical partition of data that is smaller than the firmware file and can be included in a single data packet. In addition, the terms "approximately," "roughly," and "substantially" mean±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 2:
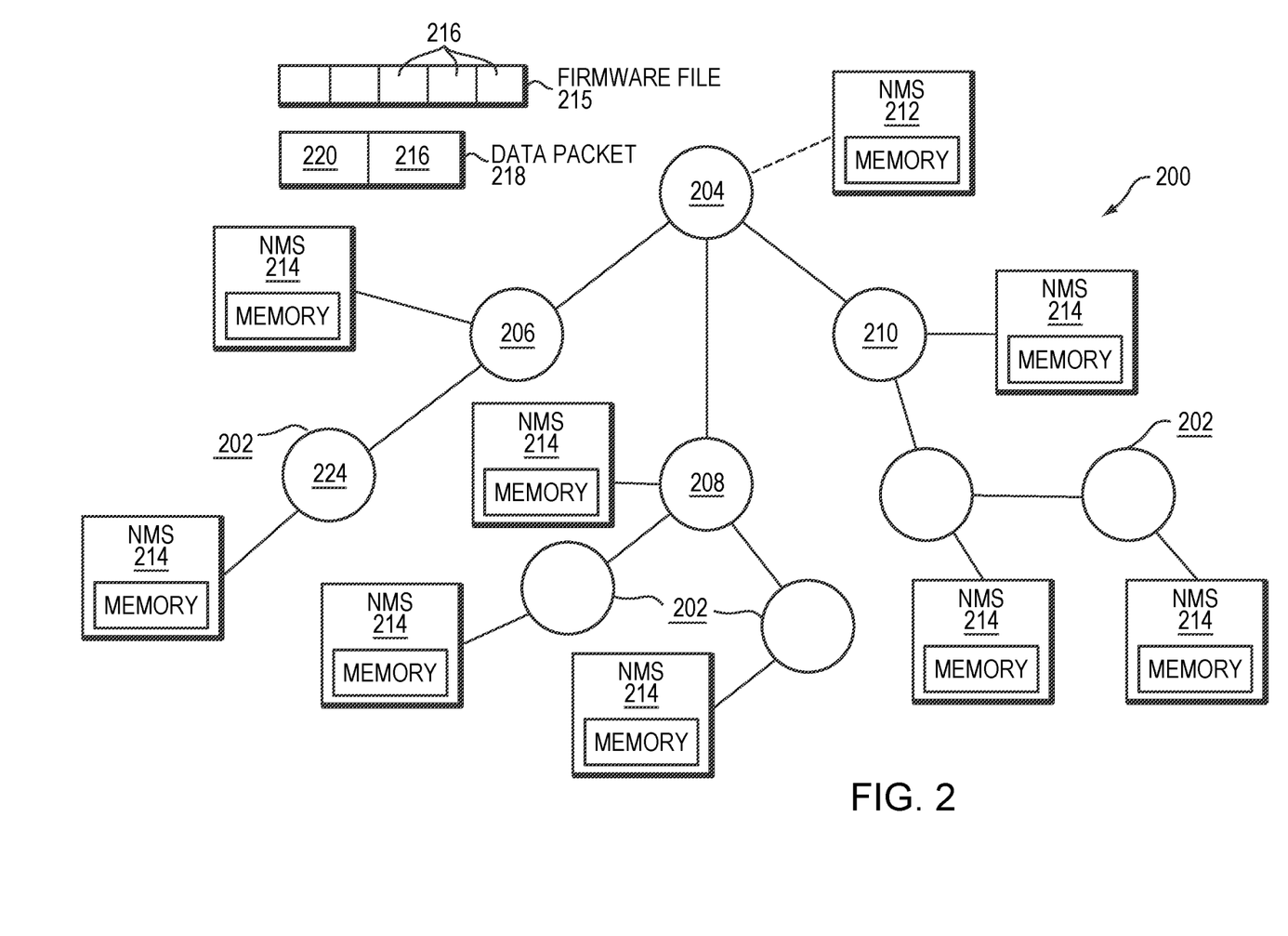
FIG. 2 conceptually illustrates an exemplary tree-based wireless network having multiple network nodes in accordance with various embodiments.

FIG. 2 conceptually illustrates an exemplary tree-based wireless network 200 comprising multiple network nodes 202; each network node 202 includes one parent node and one child node. In one embodiment, each network node 202 is a member of a transceiver "cell," i.e., a discrete geographic region having fixed-location transceivers on, for example, lighting poles. A transceiver cell typically includes a "parent" node (e.g., node 204) and one or more child nodes (e.g., nodes 206-210). In addition, each of the parent and child nodes may include one transceiver. The parent node is the "owner" of the cell node(s); a child node may be associated with only one parent node at a time. In one embodiment, the child nodes connect to their parent nodes via a "wireless tree branch." The child node(s) in a cell are within the radio transmission range of the parent node and vice versa. Typically, the parent node and its child nodes are within a one-hop distance from each other.

In various embodiments, each node acts as both a parent node (defined herein as "DL") and a child node (defined herein as "UL"). The DL node is an entity contained in a node that acts as a cell parent; and the other cell members are child nodes of the parent node located one hop away from the DL node. Similarly, the UL node is an entity contained in a node and is a cell member "owned" by a DL parent in another node (e.g., one-hop distance away that acts as the parent).

The tree-based wireless network 200 may be constructed dynamically using one or more conventional protocols and algorithms. In one embodiment, the network 200 is constructed as a spanning tree that interconnects each network node via a unique path to the tree root node. The same path may connect the tree root node to a network node. In some embodiments, the network 200 is constructed as multiple spanning trees with appropriate identifiers per tree; each tree (and thereby its associated identifier) supports a unique path between the tree root node and a network node on that tree. Thus, a downlink data packet that "originates" from the tree root node (or a network management system) may traverse a path across the tree that includes a collection of the network nodes wirelessly interconnected from the parent node of one network node to a child node within the parent's cell (i.e., one hop away). The destination network node can be reached via multiple hops. For a given tree, the path from the root node to the target node is always the same; in other words, the path acts as a "virtual circuit" for a data packet to be delivered from the root node to a target node. The virtual circuit may maintain the in-order delivery of packets, but does not guarantee that all delivered packets will reach the destination. Similarly, an uplink message may be delivered from a node to the root node via traversing a path therebetween. For example, assuming that nodes X, Y, Z are along the path from the node originating the message to the tree root node, the message may propagate in the uplink manner along the wireless branches—i.e., from the originating node UL (e.g., a child contained within node X) to its associated DL (e.g., the parent contained within node Y), then internally propagate from the receiving DL to the UL contained within the same node (e.g., node Y), then propagate further up to the DL (e.g., contained within node Z) associated with the UL within node Y, and so on.

In various embodiments, each node contains two radio transceivers: one used by the parent within the node to send and/or receive data packets from the associated child node(s) and the other used by a child node within the node to send and/or receive data packets from the associated parent in another node. In one embodiment, the wireless tree network 200 further includes a network management system (NMS) 212 to control one or more gateways that act as tree root nodes to the tree-based network. In addition, each node 202 in the network 200 may include an individual NMS 214 for performing various functions (such as broadcasting a received chunk of a firmware file 215 to its associated child nodes, transmitting a NACK-request message to its child nodes, transmitting a NACK message to its parent node, etc.) as further described below. In one embodiment, an updated firmware file 215 is provided to the root node (e.g., node 204) in the tree-based network 200. The NMS associated with the root node may then divide the firmware file 215 into multiple chunks (or "blocks") such that the root node can transmit each of the chunks in a single data packet to its associated child nodes. Upon receiving the chunks, the NMS associated with each child node is responsible for delivering each of the chunks to its associated child nodes; this process can then propagate throughout the entire tree network.

The NMS 212/214 may include or consist essentially of a computing device, e.g., a server, which executes various program modules to perform methods in accordance with embodiments of the present invention. In addition, the memory may include or consist essentially of one or more volatile or non-volatile storage devices, e.g., random-access memory (RAM) devices such as DRAM, SRAM, etc., read-only memory (ROM) devices, magnetic disks, optical disks, flash memory devices, and/or other solid-state memory devices to store information associated with the tree root nodes and network nodes.

As described above, in some embodiments, the firmware file 215 is divided (e.g., by the NMS associated with the root node) into multiple chunks 216; each chunk is assigned a sequence number based on its order in the divided firmware file 215 and can be included in a single data packet 218 for transmission in the wireless network 200. In addition, each chunk 216 may be preceded by a header 220 in the data packet 218; the header 220 may include information, such as a type of the broadcast firmware file, a time stamp (e.g., a GMT date and time, such as Nov. 6, 2015, 08:00 GMT) indicating the release time of the firmware file 215, and/or a sequence number of the associated chunk in the firmware file 215. In addition, each chunk may be propagated independently from other chunks in the same version of the file 215.

In various embodiments, for each type of the firmware file, each node 202 in the wireless network 200 holds exactly one complete version of the firmware file 215 and at most one outstanding version (i.e., receiving in-progress) of the file 215. For example, the outstanding version is a newer (or "updated") version than the complete version. In one embodiment, when the node receives a chunk of a newer version of the file, but the previous version of the file is still incomplete (i.e., not all chunks have been received), the node discards the chunks of the incomplete previous version and starts to collect the chunks associated with the new version for completing the new version. In addition, each node 202 may identify the newest version (i.e., the most recently released version) of the received chunks, and subsequently transmit them to its associated child node(s) regardless whether the most recently released file is complete or still in-progress. For example, referring again to FIG. 2, the node 206 is a parent node of the node 224; assuming that the parent node 206 has a complete fourth version and incomplete fifth version of the firmware file, while the child node 224 has a complete third version and incomplete fourth version of the firmware file (this may occur when, for example, the node 224 is disconnected from the network 200 for some time), the parent node 206 may transmit the chunks of the firmware file associated with the fifth version (as opposed to the fourth version) to the child node 224. Accordingly, each node 202, upon receiving or identifying the newest version of a chunk, may store the chunk therein and subsequently transmit the chunk to its associated child node(s) in its cell using broadcasting. The child node(s) that receives the broadcast chunk may then determine whether the received chunk is the newest version it has, and if so, accepts the chunk and forwards it to the child node(s) it associated within in its own cell.

Figure 3:
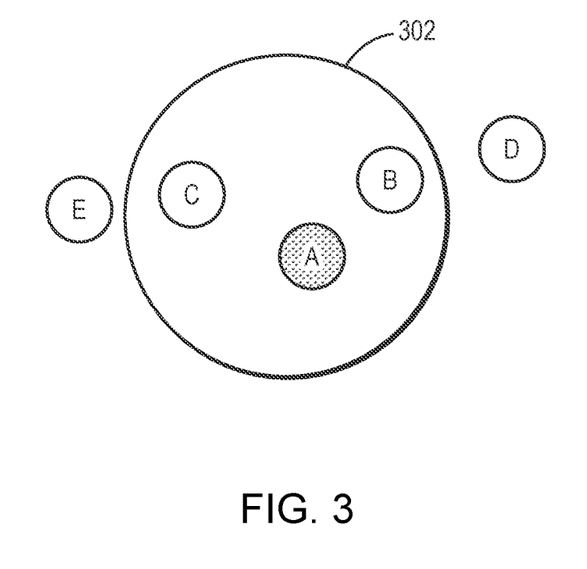
FIG. 3 conceptually depicts an exemplary tree-based wireless network having a parent node and child nodes in a transceiver cell and another nodes outside the transceiver cell in accordance with various embodiments.

It should be noted that not all the child nodes are able to accept the chunk. For example, some child nodes may miss the chunk due to a transmission error or a dynamic topology change in the tree structure (e.g., when the currently connected parent node broadcasted the chunk but the child nodes were still connected to previous parent nodes that are different from the currently connected parent node). In addition, some of the nodes may miss the broadcast chunk due to a "hidden terminal problem." For example, FIG. 3 illustrates a node A being a parent node and nodes B and C being the child nodes of node A in a cell 302; nodes D and E are network nodes outside the cell 302. Typically, before node A broadcasts a chunk of the firmware file to its associated child nodes B and C, node A may first determine whether the child nodes are "silent" (i.e., not transmitting or receiving any data packets); and if so, node A can then transmit the chunk to its child nodes B and C. But in some situations, nodes D and E, which are not child nodes of node A, are active; thus, transmissions from nodes D and E, while not detectable by node A, can still be detected by nodes B and C, respectively. Thus, transmission collisions may occur in nodes B and C. As a result, both nodes B and C may fail to receive the broadcast chunk from node A.

To avoid the hidden terminal problem and/or missing chunks in the receiving nodes due to, for example, a dynamic topology change in the tree structure described above, in various embodiments, the parent node sends its associated child nodes in the cell a "NACK-request message" periodically (e.g., every time interval, $T_{NACK}$ (e.g., 5 minutes)); the NACK-request message requests the child nodes to identify and report to the parent node which of the chunk(s) indicated in the NACK_request message is missing in the receiving child nodes. The NACK-request message may be an independently transmitted message or incorporated into a BEACON message. For ease of explanation, approaches for reliably updating the firmware file in the network nodes described herein assume that the NACK-request message is transmitted as an independent message, but one of skill in the art would understand that the same approaches may be utilized when the NACK-request message is incorporated into a BEACON message and are thus within the scope of the present invention.

In various embodiments, the child nodes, upon receipt of the NACK-request message, identify the missing chunks therein and report them to the parent node via transmission of a "NACK message." In various embodiments, it is desired to minimize the number of transmissions of the NACK messages from the child nodes to the parent node so as to prevent a "NACK storm" (e.g., too many NACK messages being received at the same time) in the parent node. In addition, transmissions of NACK messages may be scheduled to occur when the tree-based network is relatively idle. As further described below, in some embodiments, scheduling transmission of the NACK message can be controlled by the parent node based on the NACK-request messages transmitted therefrom.

Figure 4:
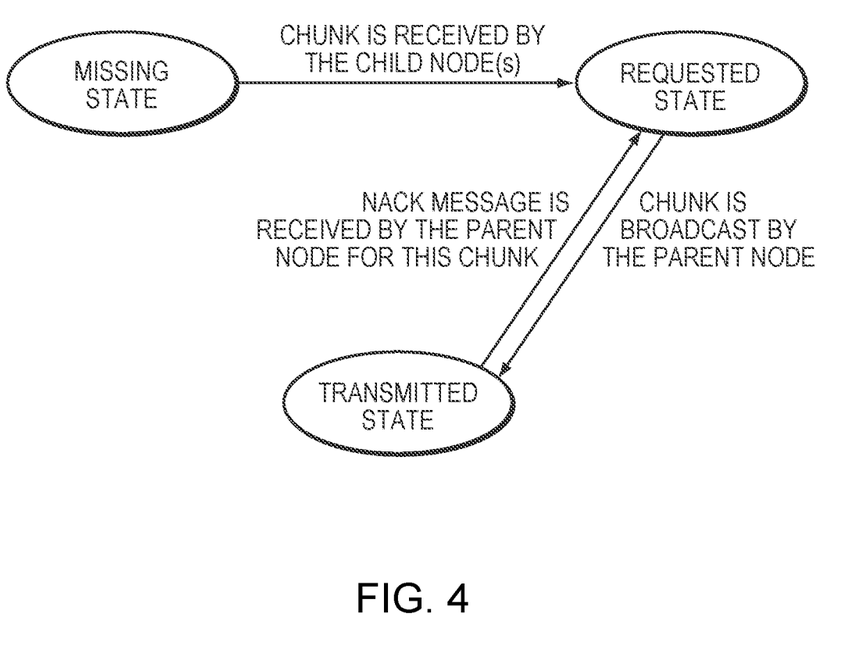
FIG. 4 illustrates three states associated with each chunk of a firmware file in accordance with various embodiments.

In various embodiments, upon receiving a list of missing chunks from its child nodes, the parent node adds the list to its future schedule. Thus, the list of chunks in the future schedule may include the missing chunks (which are identified in a NACK message sent from at least one of its child nodes) and one or more new chunks (which have not yet been broadcast). Referring to FIG. 4, to determine the timing for transmitting the new chunks and re-transmitting the missing chunks, in various embodiments, each chunk at the parent node is classified into one of three states: (i) a "missing" state indicating that at least one of the child nodes does not have the chunk, (ii) a "requested" state indicating that a child node needs to broadcast the chunk, and (iii) a "transmitted" state indicating that the parent node has broadcast this chunk to the child nodes but a NACK message has not been received since last transmission. Typically, all the chunks in the in-progress firmware file are in one of the above-identified three states.

In various embodiments, based on the classified state associated therewith, the timing for transmitting each chunk can be determined. For example, when the parent's scheduler is invoked to put new data packets in the delivery queue, the parent node may first select the chunks having a "requested" state; the parent node may then create a data packet from each selected chunk and deliver the packets to a queue for broadcasting. After the chunks are broadcast, the parent node may change the state of the selected chunks to "transmitted," indicating that the chunks have not been requested since they were transmitted last time. The "transmitted" state may be changed to the "requested" state at a later time. For example, while a broadcast chunk has been received by all child nodes that are currently associated with the parent node, a new child node may join the cell at a later time (e.g., one hour later) and need to broadcast the chunk to its associated child nodes. Thus, the chunk's state may have to be changed to "request" in order to be placed in the queue for broadcasting.

In one embodiment, the parent node sends a NACK-request message only when all the following conditions are satisfied: (i) there are no more "requested" chunks therein; (ii) at least a predetermined time interval (e.g., $T_{NACK}$) has elapsed since the last NACK-request message was sent or at least a predetermined number (e.g., 50) of the chunks have been transmitted since the last transmission of a NACK-request message; and (iii) the parent node knows that there may be at least one receiving child node that has not received one or more of the chunks (thus, if the parent node knows that all the receiving child nodes have received all the chunks, there is no need for the parent node to send the NACK-request message).

The NACK-request message may include information associated with the chunks that have been transmitted by the parent node. For example, the NACK-request message may include a complete set of the sequence numbers associated with all the transmitted chunks. In various embodiments, only a subset of the sequence numbers associated with the transmitted chunks is indicated in a NACK-request message (e.g., for saving space). This may occur when, for example, the length of the NACK-request message is limited and the broadcast firmware file contains a large amount of chunks. The parent node may thus reduce the length of the MACK-request message by including only a subset of the sequence numbers in each message and having different sets of the sequence numbers included in different MACK-request messages transmitted at different times. To achieve this, in one embodiment, the parent node includes a database maintaining a cyclic pointer for indicating the sequence number of the last chunk in the last-sent NACK-request message. Based thereon, the parent node can then include the sequence numbers of the following chunks in a new NACK-request message. In a simplified example, there are 100 chunks in the updated firmware file and the parent node has received and broadcast the chunks having sequence numbers {1-8, 9, 11, 13-20, 21, 22, 23-40, 41, 44-47, 50-52, 54-60, 70-85, 86, 87, 89-100}. Assuming that the cyclic pointer at the parent node points to the sequence number 24, and that the NACK-request message has space for encoding six numbers only, the parent node may transmit a NACK-request message having the sequence numbers of 25-40, 41, 44-47, 50, and adjusts the cyclic pointer to number 50 after transmission of the NACK-request message. Similarly, if the cyclic pointer indicates that the sequence number of the last transmitted chunk is 91, then the parent node may transmit the next NACK-request message with the sequence numbers of 92-100, 1-8, 9, 11.

It should be noted that in some situations, the chunks are already transmitted by the parent node but because there is no need for the parent node to receive a NACK message, the sequence numbers of these chunks will not be listed on the NACK-request message. For example, when the parent node has already received a NACK message for a specific sequence number and the chunk associated therewith is currently awaiting retransmission, there may be no need to receive a NACK message for it.

As described above, upon receiving the NACK-request message from the parent node, the child node may respond by transmitting a NACK message to the parent node. In various embodiments, the child node implements a transmission approach for minimizing the number of transmissions of the responding NACK messages to the parent node and spreading the NACK messages as equally as possible over a predetermined time period (e.g., in the next $T_{NACK}$ period). In one embodiment, the transmission approach starts by determining the number of chunks identified in the NACK-request message but missing in the child node. Based thereon, fractions of the missing chunks and non-missing chunks (FNMC) can be computed. For example, if the NACK-request message includes the sequence numbers 92-100, 1-8, 9, 11 (i.e., 19 chunks in total) and the child node is missing only chunks 1-3 (i.e., 3 chunks in total), then the fraction of missing chunks is $3/19=0.15$, and the fraction of non-missing chunks is FNMC=0.85. The child node then draws a random time between 0 and (FNMC×$T_{NAC}$) before transmitting its NACK message to the parent node. Using this approach, the child nodes that miss more chunks may access the wireless channel before the child nodes that miss fewer chunks. In addition, this approach may significantly reduce the expected number of transmissions of the responding NACK messages to the parent node. For example, in the above example, assuming that $T_{NAC}$ is five minutes, there is a random time between 0 and 0.85×5=4.25 minutes before the child node sends a response to the parent node. While the child node awaits the drawn time to elapse, it may realize that all its missing sequence numbers have been reported by other child nodes; as a result, the child node can cancel the transmission of its NACK message. In some embodiments, after the child node's waiting time has elapsed, the node child can update its NACK message to cover the sequence numbers associated with the chunks that are still missing therein and have not been reported by other child nodes.

The transmission approach described above requires each child node to be aware of the NACK messages transmitted by other child nodes. This may be achieved by, for example, broadcasting each NACK message to all nodes in the vicinity of the transmitting child node, or allowing other child nodes to "spoof" the NACK message when it is transmitted to the parent node. Alternatively, the parent node may periodically broadcast messages summarizing the sequence numbers associated with the missing chunks that are indicated in the received NACK messages. Based thereon, the child nodes can update or cancel their NACK messages to the parent node as described above.

Figure 5:
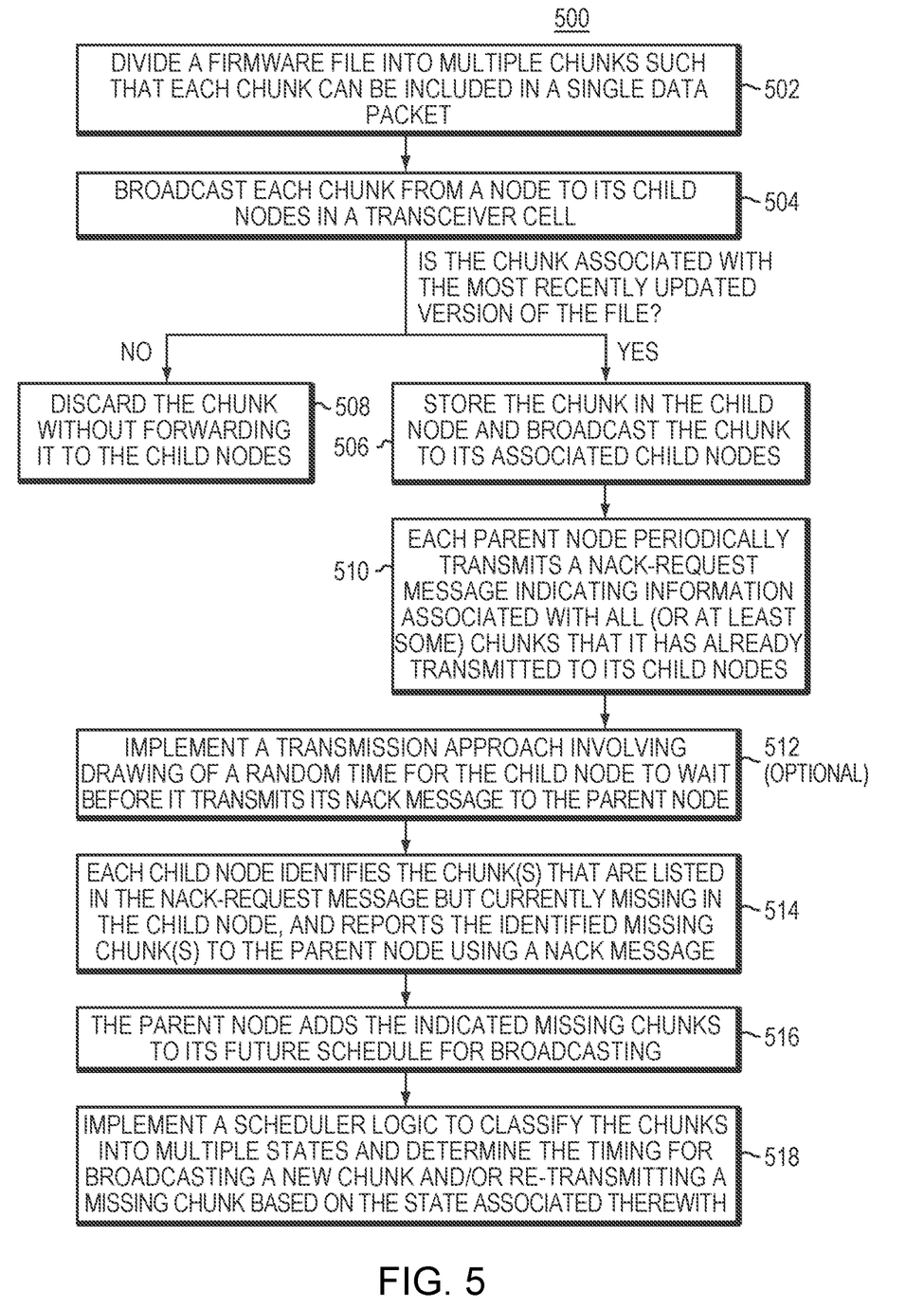
FIG. 5 is a flow chart illustrating an exemplary approach for updating a firmware file in the network nodes in accordance with various embodiments.

FIG. 5 is a flow chart illustrating an exemplary approach 500 for updating a firmware file in a tree-based wireless network in accordance herewith. In a first step 502, the firmware file is divided into multiple chunks such that each chunk can be included in a single data packet. In a second step 504, each chunk is broadcast from a node to its child nodes in a transceiver cell. Upon receiving the chunk, the child nodes may determine whether the chunk is new (i.e., an most recently updated version); and if so, the child nodes may store the chunk and broadcast the chunk to their associated child nodes (step 506). If, however, the chunk is not new, the child nodes may discard the chunk without forwarding it to the child nodes (step 508). In various embodiments, each parent node periodically transmits a NACK-request message indicating information such as the types, time stamps and/or sequence numbers associated with all (or at least some) chunks that it has already transmitted to its child nodes (step 510). In response to the NACK-request message, each child node may identify the chunk(s) that are listed in the NACK-request message but currently missing in the child node, and report the identified missing chunk(s) to the parent node using a NACK message (step 514). In one embodiment, prior to step 514, a transmission approach involving drawing of a random time for the child node to wait before it transmits its NACK message to the parent node is implemented to minimize the number of transmissions of the NACK messages, thereby preventing a "NACK storm" in the parent node (step 512). In addition, upon receipt of the NACK message indicating a list of missing chunks in the child node, the parent node may add the indicated missing chunks to its future schedule for broadcasting (step 516). In one embodiment, a scheduler logic that classified the chunks into three states is then implemented to determine the timing for broadcasting a new chunk and/or re-transmitting a missing chunk (step 518).

Figure 6:
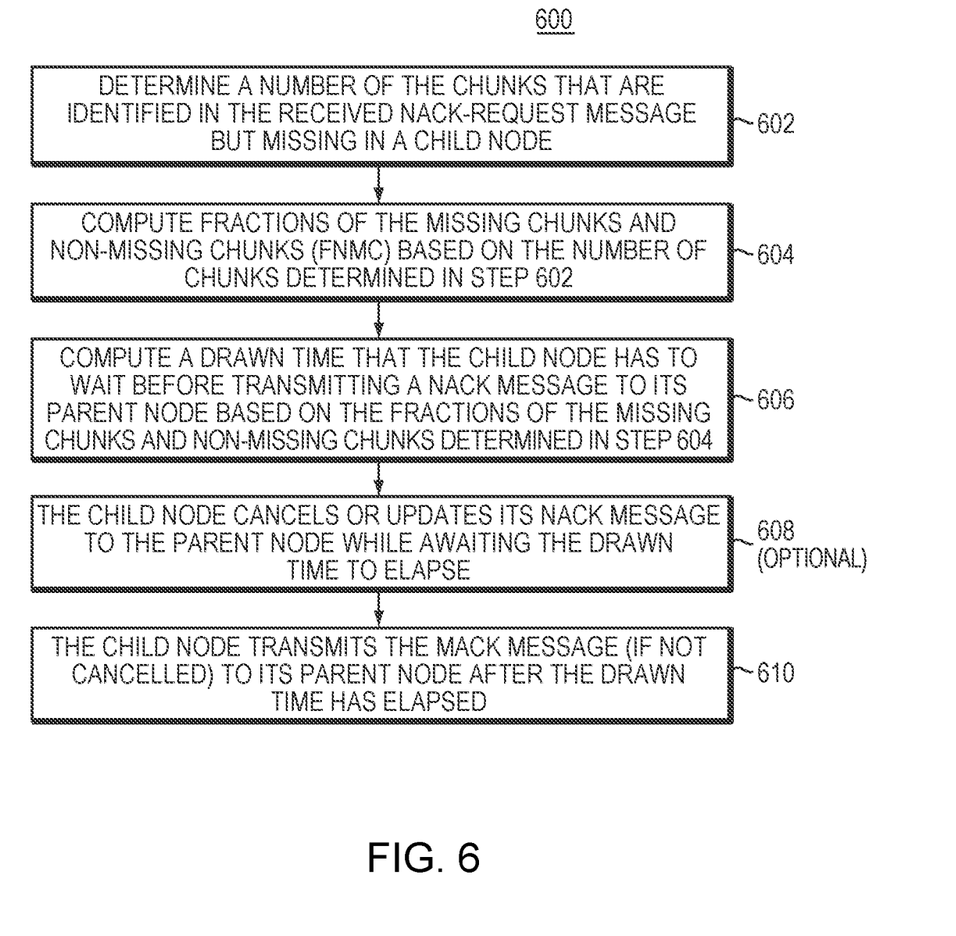
FIG. 6 is a flow chart illustrating an exemplary approach for minimize the number of message transmissions from the child nodes to the parent nodes in accordance with various embodiments.

FIG. 6 is a flow chart illustrating an exemplary transmission approach 600 for minimize the number of message transmissions from the child nodes to the parent nodes in accordance herewith. In a first step 602, a number of chunks that is identified in the received NACK-request message but missing in a child node is determined. Based thereon, fractions of the missing chunks and non-missing chunks (FNMC) can be computed (step 604). In a third step 606, a drawn time that the child node has to wait before transmitting the NACK message to its parent node is determined based on the fractions of the missing chunks and non-missing chunks computed in step 604. In a fourth step 608, the child node can cancel or update its NACK message to the parent node while awaiting the drawn time to elapse. In a fifth step 610, after the drawn time has elapsed, the child node can transmit the MACK message (if not cancelled) to its parent node.

Various embodiments described herein provide advantages over conventional approaches for updating the firmware file in a wireless tree network. For example, the approaches described herein allow a transmitting node to transmit a file even before it receives all the chunks of the file. This means that the transmitting node may transmit the chunks in an out-of-order manner. In this situation, the transmitting node can use the NACK-request message described above to inform all its receiving nodes about the chunks it wants to receive in the NACK messages. This feature is not included in any conventional approach. For example, in the negative-acknowledgment-oriented reliable multicast (NORM) approach, the transmitting node is required to have a complete firmware file such that it can transmit the data in order. Thus, a receiving node that receives a chunk having a sequence number i knows that the NACK messages can be sent for all preceding chunks (i.e., 1 . . . i−1). And if a receiving node in NOAM receives the chunk of number 5 before the chunk of number 4, the receiving node will indicate that the chunk of number 4 is missing. In contrast, the approaches described herein allow the transmitting node to receive, from its parent node, the chunk of number 5 before the chunk of number 4, and subsequently transmit the chunk of number 5 before the chunk of number 4 to its receiving nodes. Because allowing the chunks to be distributed out of order may complete the file transfer more rapidly by avoiding the head-of-the-line blocking, the approaches described herein are more efficient than NORM.

It should be noted that approaches described herein for reliably updating a firmware file can be implemented in any wireless network that has an underlying logical tree-based structure. In addition, these approaches do not require the tree to be static. If the network is dynamic, the tree structure may periodically change; the approaches described herein can automatically adapt to the new network topology. For example, as described above, when a new child node joins the network and needs to broadcast a chunk to its associated child nodes, the chunk's state may be changed from "transmitted" to "requested;" subsequently, a data packet can be created for the "requested" chunk and delivered to a queue for broadcasting. Further, implementation of the NACK-request messages from the parent nodes to the child nodes and NACK messages from the child nodes to the parent nodes may advantageously guarantee that each node connected to the tree network can eventually receive the broadcast firmware file.

The NMS 212/214 described herein may include one or more modules implemented in hardware, software, or a combination of both for performing the functions described above (e.g., steps in FIGS. 5 and 6). For embodiments in which the functions are provided as one or more software programs, the programs may be written in any of a number of high level languages such as PYTHON, FORTRAN, PASCAL, JAVA, C, C++, C #, BASIC, various scripting languages, and/or HTML. Additionally, the software can be implemented in an assembly language directed to the microprocessor resident on a target computer; for example, the software may be implemented in Intel 80×86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM. Embodiments using hardware circuitry may be implemented using, for example, one or more FPGA, CPLD or ASIC processors.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of updating a firmware file in a network comprising a plurality of cells each supporting communication among a plurality of transceiver nodes therein and being configured to receive and transmit the firmware file, each cell comprising a parent node and one or more child nodes, the method comprising:
   (a) dividing the firmware file into a plurality of chunks, each chunk being configured to be included in a single data packet transmitted between two of the transceiver nodes;
   (b) transmitting each of the chunks from a first one of the transceiver nodes to a second one of the transceiver nodes;
   (c) transmitting a request message from the first one of the transceiver nodes to the second one of the transceiver nodes, the request message comprising information associated with the chunks that have been transmitted in step (b); and
   (d) transmitting a responding message from the second one of the transceiver nodes to the first one of the transceiver nodes, the responding message comprising information associated with at least one of the chunks that is included in the request message of step (c) but not received by the second one of the transceiver nodes.

2. The method of claim 1, further comprising assigning a sequence number to each of the chunks based at least in part on an order of the chunk in the divided firmware file.

3. The method of claim 2, wherein each of the chunks in its associated data packet is preceded by a header comprising information of at least one of a type of the firmware file, a time stamp indicating a release time of the firmware file, or the sequence number associated with the chunk.

4. The method of claim 2, wherein the information associated with the chunks in the request message and responding message comprises the sequence numbers associated with the chunks.

5. The method of claim 4, further comprising, upon the first one of the transceiver nodes receiving the responding message, storing the sequence number associated with the at least one of the chunks in a delivery queue associated with the first one of the transceiver nodes for further transmission.

6. The method of claim 5, further comprising classifying each of the chunks in the delivery queue into a plurality of states based at least in part on a status of the chunk in a child node associated with the first one of the transceiver nodes.

7. The method of claim 6, further comprising determining a timing for transmitting each of the chunks in the delivery queue based at least in part on its associated state.

8. The method of claim 1, further comprising, upon the second one of the transceiver nodes receiving the transmitted chunks, determining whether each of the received chunks is associated with a most recently released version of the firmware file.

9. The method of claim 8, further comprising upon determining that the chunk is associated with the most recently released version of the firmware file, storing the chunk in a database associated with the second one of the transceiver nodes and causing the second one of the transceiver nodes to transmit the chunk to one or more child nodes associated therewith.

10. The method of claim 1, wherein the chunks in step (b) are transmitted in a broadcasting manner.

11. The method of claim 1, further comprising, prior to step (d), determining a time interval for the second one of the transceiver nodes to wait before transmitting the responding message to the first one of the transceiver nodes.

12. The method of claim 11, wherein the time interval is determined based at least in part on a number of the chunks included in the request message of step (c) that are not received by the second one of the transceiver nodes.

13. The method of claim 1, wherein each of the transceiver nodes stores exactly one complete version of the firmware file whose chunks are all received and at most one outstanding version whose chunks are only partially received.

14. A network system for updating a firmware file in a network comprising a plurality of cells each supporting communication among a plurality of transceiver nodes therein and being configured to receive and transmit the firmware file, each cell comprising a parent node and one or more child nodes, the system comprising:
   at least one network management system associated with at least one of the transceiver nodes, the at least one network management system being configured to:
   (a) divide the firmware file into a plurality of chunks, each chunk being configured to be included in a single data packet transmitted between two of the transceiver nodes;
   (b) transmit each of the chunks from a first one of the transceiver nodes to a second one of the transceiver nodes;
   (c) transmit a request message from the first one of the transceiver nodes to the second one of the transceiver nodes, the request message comprising information associated with the chunks that have been transmitted in step (b); and
   (d) transmit a responding message from the second one of the transceiver nodes to the first one of the transceiver nodes, the responding message comprising information associated with at least one of the chunks that is included in the request message of step (c) but not received by the second one of the transceiver nodes.

15. The network system of claim 14, wherein the at least one network management system is further configured to assign a sequence number to each of the chunks based at least in part on an order of the chunk in the divided firmware file.

16. The network system of claim 15, wherein each of the chunks in its associated data packet is preceded by a header comprising information of at least one of a type of the firmware file, a time stamp indicating a release time of the firmware file, or the sequence number associated with the chunk.

17. The network system of claim 15, wherein the information associated with the chunks in the request message and responding message comprises the sequence numbers associated with the chunks.

18. The network system of claim 17, further comprising memory for storing a delivery queue associated with the first one of the transceiver nodes, the at least one network management system being further configured to, upon the first one of the transceiver nodes receiving the responding message, store the sequence number associated with the at least one of the chunks in the delivery queue for further transmission.

19. The network system of claim 18, wherein the at least one network management system is further configured to classify each of the chunks in the delivery queue into a plurality of states based at least in part on a status of the chunk in a child node associated with the first one of the transceiver nodes.

20. The network system of claim 19, wherein the at least one network management system is further configured to determine a timing for transmitting each of the chunks in the delivery queue based at least in part on its associated state.

21. The network system of claim 14, wherein the at least one network management system is further configured to, upon the second one of the transceiver nodes receiving the transmitted chunks, determine whether each of the received chunks is associated with a most recently released version of the firmware file.

22. The network system of claim 21, further comprising memory for storing the received chunks in a database associated with the second one of the transceiver nodes, the at least one network management system being further configured to, upon determining that the received chunks are associated with the most recently released version of the firmware file, cause the second one of the transceiver nodes to transmit the chunks to one or more child nodes associated therewith.

23. The network system of claim 14, wherein the chunks in step (b) are transmitted in a broadcasting manner.

24. The network system of claim 14, wherein the at least one network management system is further configured to, prior to step (d), determine a time interval for the second one of the transceiver nodes to wait before transmitting the responding message to the first one of the transceiver nodes.

25. The network system of claim 24, wherein the time interval is determined based at least in part on a number of the chunks included in the request message of step (c) that are not received by the second one of the transceiver nodes.

26. The network system of claim 14, wherein each of the transceiver nodes stores exactly one complete version of the firmware file whose chunks are all received and at most one outstanding version whose chunks are only partially received.

* * * * *